(No Model.)  E. B. MANNING.  2 Sheets—Sheet 1.
TEA OR COFFEE POT.

No. 306,272.  Patented Oct. 7, 1884.

Witnesses.  Edward B. Manning
Inventor,
By Atty (No Model.)  2 Sheets—Sheet 2.

E. B. MANNING.
TEA OR COFFEE POT.

No. 306,272. Patented Oct. 7, 1884.

Witnesses
Jos. C. Earle
Harry P. Earle.

Edw. B. Manning
Inventor
By Atty
John C. Earle

UNITED STATES PATENT OFFICE.

EDWARD B. MANNING, OF MERIDEN, CONNECTICUT.

TEA OR COFFEE POT.

SPECIFICATION forming part of Letters Patent No. 306,272, dated October 7, 1884.

Application filed April 7, 1884. (No model.)

*To all whom it may concern:*

Be it known that I, EDWARD B. MANNING, of Meriden, in the county of New Haven and State of Connecticut, have invented a new Improvement in Tea and Coffee Pots; and I do hereby declare the following, when taken in connection with accompanying drawings and the letters of reference marked thereon, to be a full, clear, and exact description of the same, and which said drawings constitute part of this specification, and represent, in—

Figure 1:
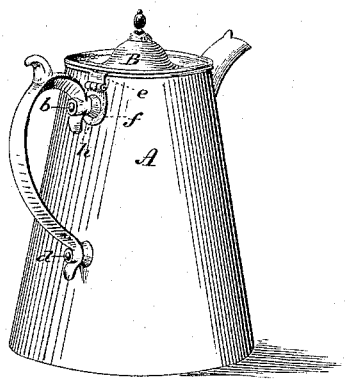
Figure 2:
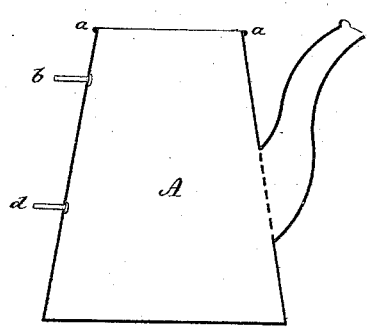
Figure 3:
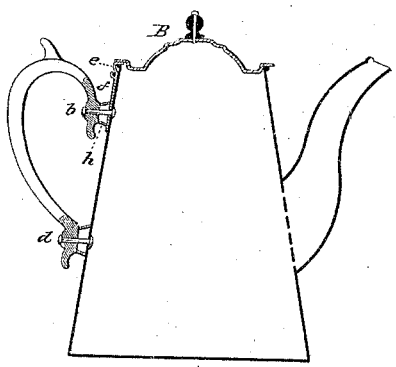
Figure 4:
Figure 5:
Figure 6:
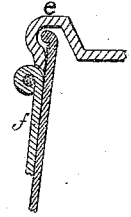

Figure 1, a perspective view of the pot from the rear; Fig. 2, a vertical section of the pot with the cover and handle detached; Fig. 3, a vertical section showing the cover and handle attached; Fig. 4, the hinge detached; Fig. 5, the collar $h$ made as an integral part of the leaf $f$ of the hinge enlarged; Fig. 6, a transverse section of the cover, showing the one leaf, $e$, of the hinge made as an integral part of the cover enlarged.

This invention relates to an improvement in that class of tea and coffee pots which are made from iron, the surface enameled or coated with a vitreous material, and particularly to the method of hinging the cover to the pot. In the more general construction of the cheaper pots of this class a wire is inclosed at the upper edge of the pot, and at the rear of the pot a notch is cut in the body of the pot to expose the wire. The hinge of the cover is bent around this wire, and so that the wire at that point serves as a pintle. This notch is necessarily cut before the pot is glazed, and however nicely the work may be done it gives to the pot at that point an unfinished appearance where the hinge is applied, and necessarily more or less of an opening around the hinge into the pot.

The object of my invention is to avoid cutting the upper edge of the pot, and to hang the cover entirely outside the pot. To this end my invention consists in attaching one leaf of the hinge to the cover, or forming it as a part of the cover, a second leaf connected thereto by a common hinge-knuckle, the second leaf extending down upon the outside of the pot and over the stud by which the handle is secured to the pot, as more fully hereinafter described.

The body A of the pot is of the usual construction for the cheaper class of pots. At its upper end the metal is rolled over to inclose the wire, as at $a$, as in the usual construction. The body is coated complete also in the usual manner.

To attach the handle, a stud, $b$, is made fast to a point near the top, and a similar stud, $d$, near the bottom, as seen in Fig. 2. The cover B is provided with a hinge, one leaf, $e$, of which is attached to the cover, the other leaf, $f$, of a length to extend down upon the body of the pot, and provided with a perforation, $g$, to pass on over the stud $b$ on the outside of the pot. The hinge is shown detached in Fig. 4. Over the stud $a$ collar, $h$, is set in the usual manner. The handle has a hole through it, so as to be set on over the stud, as seen in Fig. 3, and then the end of the stud is upset or enlarged by solder or otherwise, so as to secure the handle to the cover, the lower end being secured in like manner. The collar $h$ may be soldered to the stud before the handle is applied, and also soldered to the leaf of the hinge, or the leaf of the hinge may be soldered to the collar independent of the stud, or the collar may be made as a part of the leaf of the hinge, the essential feature of my invention being extending the leaf of the hinge down outside the pot and secured thereto by means of the device which secured the upper end of the handle. This construction avoids cutting the upper edge of the pot for the attachment of the hinge, and therefore overcomes the objections to, or difficulties arising from, such cutting away of a portion of the pot.

It will be understood that one leaf, $e$, of the hinge may be made a part of the cover or soldered to it.

I claim—

1. In a tea or coffee pot, the cover provided with a hinge, one leaf of which extends down outside the body of the pot and is secured thereto in connection with the device by which the handle is secured, substantially as described.

2. In a tea or coffee pot, the cover provided with a hinge, one leaf, $f$, of which extends down upon the body of the pot and over the stud by which the handle is attached, said stud serving as a means for securing said leaf to the pot, substantially as described.

EDWARD B. MANNING.

Witnesses:
LILLIAN D. KELSEY,
J. H. SHUMWAY.